April 20, 1943.
D. McLACHLAN, JR
2,317,329
SPECIMEN HOLDER FOR X-RAY ANALYSIS
Filed Oct. 20, 1942
3 Sheets-Sheet 1
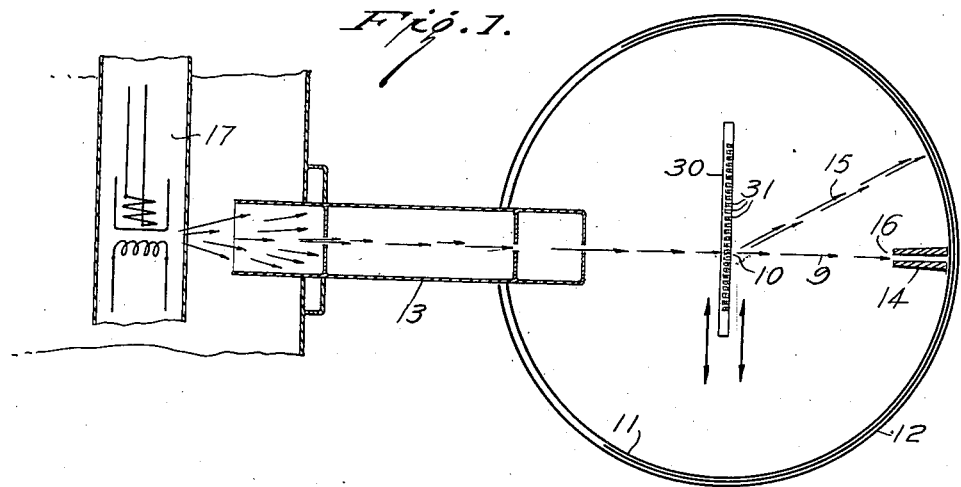
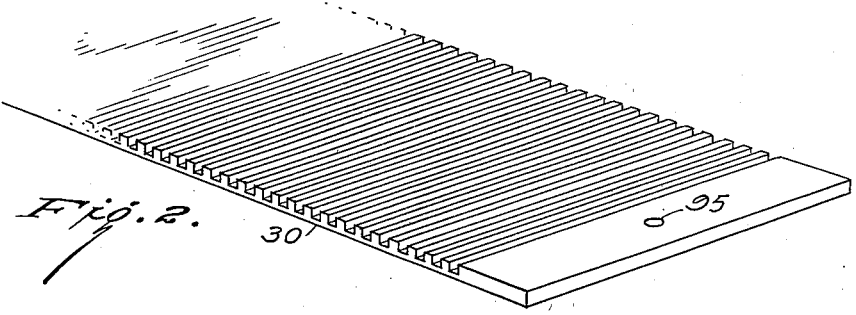
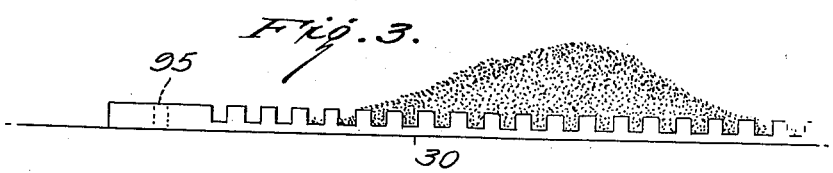
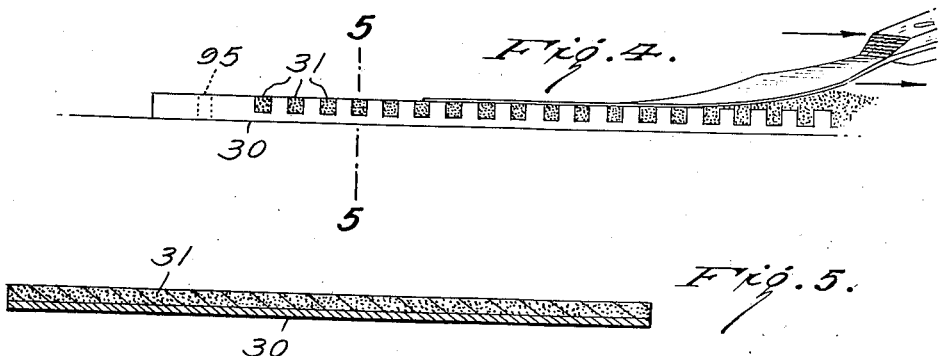
INVENTOR
DAN McLACHLAN, JR.,
BY Frank J. Novotny
ATTORNEY.

April 20, 1943.  D. McLACHLAN, JR  2,317,329
SPECIMEN HOLDER FOR X-RAY ANALYSIS
Filed Oct. 20, 1942  3 Sheets-Sheet 2
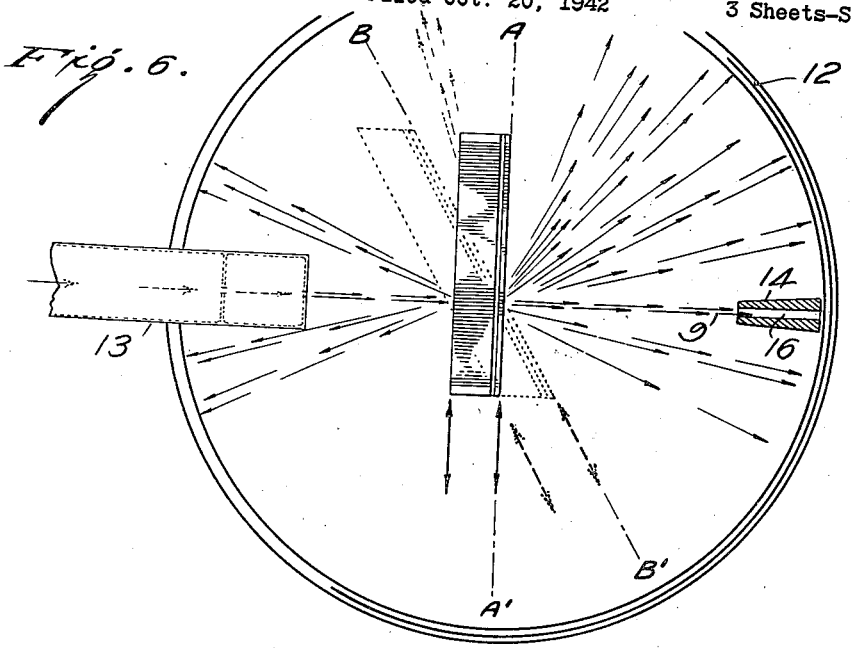
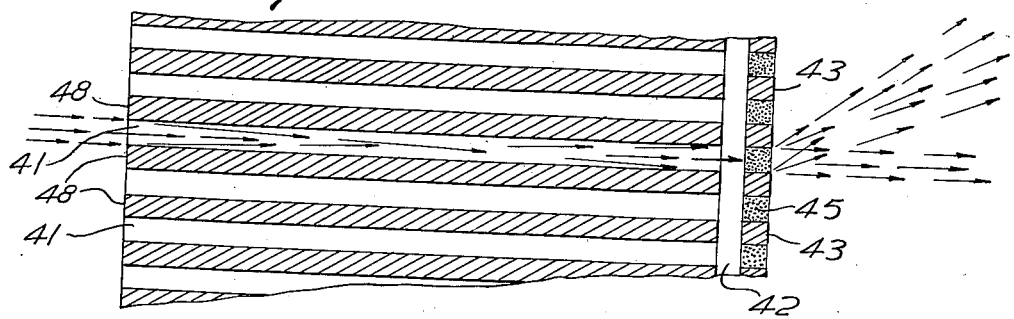
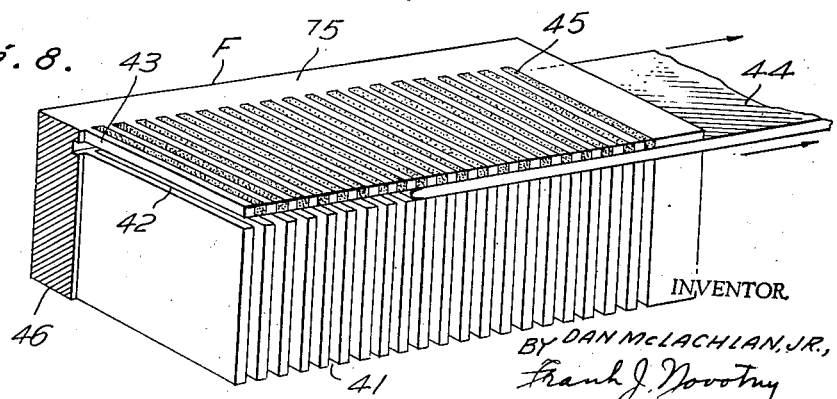
INVENTOR.
BY DAN McLACHLAN, JR.,
Frank J. Novotny
ATTORNEY.

April 20, 1943.                D. McLACHLAN, JR                    2,317,329
                       SPECIMEN HOLDER FOR X-RAY ANALYSIS
                              Filed Oct. 20, 1942                3 Sheets-Sheet 3
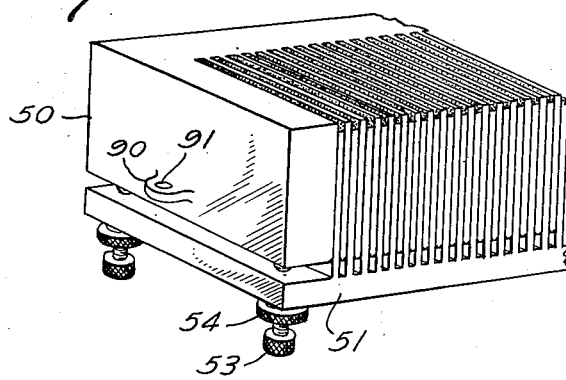
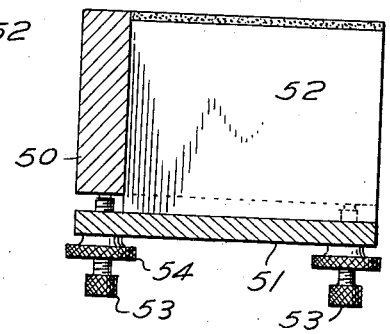
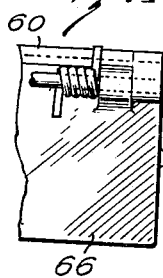
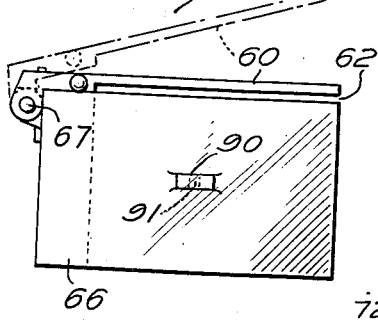
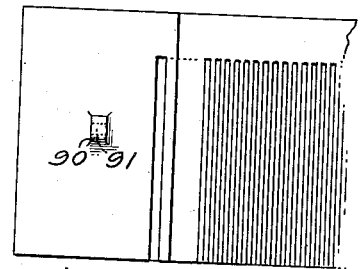
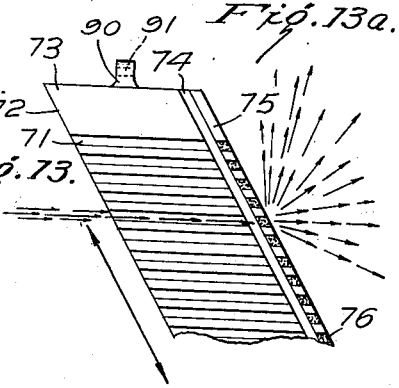
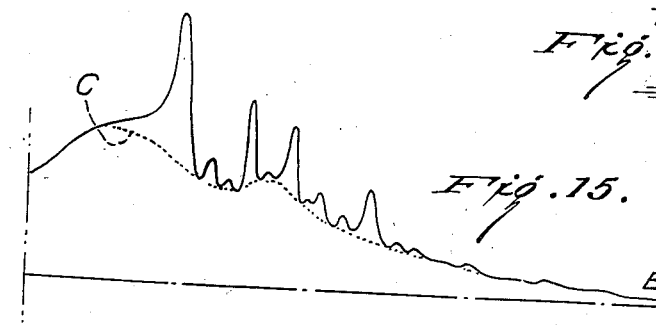
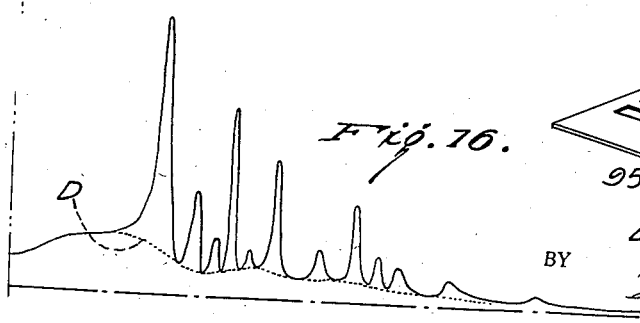
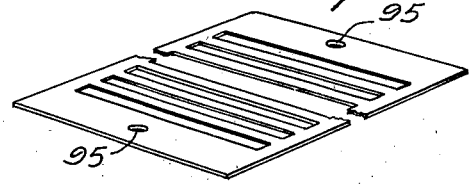
INVENTOR.
DAN McLACHLAN, JR.,
BY
Frank J. Novotny
ATTORNEY.

Patented Apr. 20, 1943

2,317,329

UNITED STATES PATENT OFFICE 2,317,329

SPECIMEN HOLDER FOR X-RAY ANALYSES

Dan McLachlan, Jr., Old Greenwich, Conn., assignor to American Cyanamid Company, New York, N. Y., a corporation of Maine Application October 20, 1942, Serial No. 462,671

7 Claims. (Cl. 250—53)

This invention relates to an improved specimen holder or frame for use with a camera adapted for the X-ray analysis of powdered materials, crystalline substances, and the like. More particularly, it embraces an auxiliary apparatus which when attached to a conventional X-ray camera set up for standard Hull-Debye-Scherrer powder analyses, is adapted to pass or reciprocate crystalline specimens continuously or intermittently through the path of the incident X-ray beam normally used in such a camera.

Heretofore, in order to obtain satisfactory X-ray photographs in accordance with the standard Hull-Debye-Scherrer technique of X-ray analysis for powdered materials, it was necessary to grind the material to 200 mesh or smaller. In use, such a camera includes an incident primary X-ray beam which passes through the powder specimen, is diffracted and falls upon a photographic film as a series of successive lines each uniformly intense throughout and each corresponding to one interplanar distance, familiar to those versed in X-ray technique.

However, some substances, and more particularly organic crystalline materials, do not lend themselves to such fine grinding as 200 mesh. For example, sulfanilamide when ground to approximately such size does not remain as a perfectly ordered crystalline material, but is distorted as a result of the grinding process. This results in the obtainment of X-ray photographs which are not replicas of those produced from the crystalline material in its unground or natural state. However, when such organic crystalline material is left in a relatively coarser crystalline state and its diffraction pattern obtained while held in a single capillary tube, a spotty photograph or one displaying discontinuous lines is usually obtained. This is due to the relatively small number of crystals lying in the scope of the beam. Such a photograph is not capable of yielding the necessary intensity and distance measurements with such accuracy as is now demanded in industrial and scientific research.

It is an object of this invention to render unnecessary the fine grinding, with its accompanying distortion, of crystalline materials for use in X-ray analysis while nevertheless facilitating the obtainment of powder diffraction patterns wherein the lines are fine, continuous and of even intensity throughout their length.

Another object of this invention is to provide means facilitating the obtainment of X-ray powder diffraction pictures having a minimum of background or darkening of an exposed film such as is caused when the incident X-rays are scattered by a conventional powder holder, i. e., a glass capillary tube.

Still another object is to provide a powder holder wherein the shape of the sample is well defined.

A further object is to provide a holder which will not obstruct the X-rays and/or scatter them partially or totally either before or after the X-rays strike the powder sample.

Still other and further objects will become apparent upon reading the following description incorporating various embodiments of this invention. It is to be understood that the examples herein given in considerable detail are merely illustrative and not limitative of this invention.

In general this invention attains the above and other objects by providing apparatus wherein a plurality of capillary compartments or similarly elongated sample holders filled with a comminuted specimen are passed through the collimated X-ray beam of a Hull-Debye-Scherrer type of powder camera to obtain a series of superimposed X-ray pictures which are recorded on a single film in the form of continuous line spectra of even intensity throughout, and having its background intensity reduced to a minimum. Heretofore, the usual high background intensity or fogging of the film resulted from the scattering of X-rays by the holder.

In order to facilitate a more complete understanding of the principles of this invention, a number of drawings forming a part of this disclosure are included herein and illustrate clearly a number of embodiments of the invention. The scope of the invention, however, is to be limited solely by the appended claims.

This invention embodies improved specimen holders or sample frames for use with the conventional X-ray camera such as that used for standard Hull-Debye-Scherrer powder analyses. Such a camera is disclosed in McLachlan's copending application, Serial No. 433,427, filed March 5, 1942, for "improvement in X-ray technique." In the drawings:

Fig. 1 is a diagrammatic illustration showing in section one type of reciprocating sample frame or powder holder in position in a quadrant cassette of a conventional type of Hull-Debye-Scherrer camera;

Fig. 2 is a perspective view, somewhat enlarged, of the sample frame of Fig. 1;

Figs. 3 and 4 illustrate one method of filling the channels of this type of sample frame with a powdered crystalline specimen;

Fig. 5 is a cross-sectional view taken on the line 5—5 of Fig. 4 showing the upper layer of crystals and the lower supporting or backing layer of the sample holder;

Fig. 6 is a diagrammatic illustration somewhat similar to Fig. 1, showing another type of sample holder;

Fig. 7 is an enlarged view of the sample holder of Fig. 6;

Fig. 8 illustrates the method of filling the interstices cut in the comb-like specimen holders with a comminuted or powdered crystalline material;

Fig. 9 is still another specimen holder showing the method of filling the same with a powdered sample;

Fig. 10 is a sectional view showing the crystalline specimen in place;

Figs. 11 and 12 are still other types of specimen holders;

Fig. 13 is a side view of an improved specimen holder adapted to give a diffraction photograph of wider scope; and Fig. 13a is a top plan view of the same;

Fig. 14 is still another embodiment of a specimen holder which can be filled by laying the same on a flat surface;

Fig. 15 is a densitometer reading of a photograph taken with a specimen holder of the usual type, i. e., a glass capillary tube or corrugated mount, showing the high background density obtained with a specimen holder of the usual type, while Fig. 16 shows the lower background density obtained with a specimen holder of the type shown in Figs. 7, 8, 9 and 13.

Referring now in more detail to the drawings, more particularly to Figs. 1 and 6, cassette 11 has wrapped thereon a photographic film 12. This film is in the form of a narrow strip and hence is used to record a desired portion of the X-ray beam and its diffracted beam or beams, namely those falling on or within the cylindrical surface. Any laterally diffracted X-rays are lost and left unregistered. Usually, the film pack consists preferably of three layers, namely an inner sheet of aluminum foil .001 inch thick to keep out ordinary light while admitting X-rays, the film 12 itself, and an outer fluorescent screen backing to render the film to hold the film pack in place on the cassette more sensitive. A spring brass collar is used to hold the film pack in place on the cassette and a cover ring thereover completes the assembly of the film on the cassette.

The collimeter 13 contains a slit system which is used to define the emerging X-rays in the form of a thin flat beam which strikes a sample cluster of crystals 10 introduced into its path at the axis of the cassette. The zero or undiffracted beam 9 enters the zero beam trap 14 while the diffracted beams 15 strike the film where they are recorded. A removable plug may be inserted in the zero beam trap opening 16 in order to block out the position of the zero beam from the film. Momentarily removing the plug during an exposure is sufficient to record the position of the zero beam on the film. The X-ray tube is indicated at 17.

A novel feature of the particular embodiments of the invention disclosed in Figs. 1 to 5, inclusive, embraces the thin layer of resinous or glass supporting material 30, Figs. 2, 4 and 5, through which the incident X-rays travel in order to reach the specimen 31, Figs. 4 and 5. This reduces materially the absorption of the incident X-ray beam as well as almost eliminates the diffraction lines which are characteristic of the material from which the holder is made and which heretofore appeared on the photographic film causing a darkening of the film and hence rendered interpretation thereof difficult.

However, a further improvement characterized by total absence of the particular diffraction lines or scattered X-rays originating from the material from which the holder is made is illustrated in the specimen frames shown in Figs. 6 to 14, inclusive.

In the modification shown in Figs. 7 and 8, the holder, preferably made of a metal such as brass, for example, has grooves cut or slotted as on a milling machine to provide channels 41 in a portion of which the crystalline specimens are tamped. In order to facilitate the filling of these grooves to a uniform depth another channel 42 is milled across the grooves 41 so as to separate the brass stack into a comb-like portion and a channel portion 46. In mounting the crystalline material between the teeth 43 of the comb-like portion, a sheet of metal 44, Fig. 8, is inserted in slot 42 and the crystalline powder is packed in the openings as shown at 45. When the sample has been tamped into position, metal sheet 44 is removed as shown in Fig. 8 and the sample holder is ready for mounting in the cassette of the X-ray machine as illustrated in Fig. 6.

The embodiment illustrated in Figs. 9 and 10 comprises complementary grooved units 50 and 51 fitting into one another. The extent of insertion of the elements 52 into the grooves of 50 is adjustably determined by thumb screws 53 and lock nuts 54. In this manner the thickness of the compacted crystalline specimen can be predetermined.

In Figs. 11 and 12 the comb-like portion of Fig. 8 is shown as a separate unit 60, hinged to the brass grooved or channel portion 66 at spring tensioned hinge 67. This specimen holder is filled with a crystalline material in the same manner as that of Fig. 8, usually by inserting a metal plate in the opening 62 and then tamping the powdered specimen between the teeth of the comb-like portion 60.

The modification shown in Figs. 13 and 13a is a preferred type of brass stack mounting frame. Here the grooves 71 are cut or milled at an angle other than a right angle to the edge 72 of the mounting frame 73. This frame also has a slot 74 cut parallel to edge 75 for the insertion of a metal sheet to facilitate the packing of the specimen 76 between the teeth of the comb-like portion. Fig. 13a is a top plan view of the apparatus shown in Fig. 13 and shows clearly the arrangement of the various slits or grooves.

With the modified structure shown in Figs. 13 and 13a a much more complete X-ray diffraction picture is obtainable as may be seen by reference to Fig. 6 where the portion of the film to the right of vertical line AA' is the limit of exposure of film 12 using the sample holders illustrated in Figs. 1 to 12, whereas the portion of the film between lines AA' and BB' is in addition exposed and records an additional portion of the diffraction pattern when the specimen holder of Figs. 13 and 13a is used. This improved result is readily understood by referring to Fig. 6 where the broken lines indicate diagrammatically the position of the specimen holder of Figs. 13 and 13a when used in place of the specimen holder of Fig. 7, which is shown in full lines in Fig. 6.

The advantages of the brass stack specimen mount are very clearly understood by reference to Fig. 7 where it can be seen that, (1) the X-rays which strike the powder are diffracted in the normal way and are registered on the front half of the film; (2) the X-rays which strike the channel partitions 48, flatly, are reflected back and are registered on the back half of the photographic film; and (3) the X-rays which strike the channel partitions internally through grooves 41 are guided down the channels and can only strike the zero beam trap 14.

As a result, it is found that the brass stack holder is far superior even to the corrugated holder (of Figs. 1 to 5, inclusive), made of an amorphous organic material, as the results of Figs. 15 and 16 show. Fig. 15 is a densitometer record of an X-ray diffraction film taken with the holder of Figs. 1 to 5, showing the density or darkness of the film by the ordinates of broken line C due to the scattering of the X-rays caused by the amorphous material forming the holder. The densitometer record shown in Fig. 16, as indicated by broken line D, clearly is a curve having a lower background density and hence is a more desirable representation of the X-ray diffraction pattern of a crystalline specimen. The brass stack of Figs. 13 and 13a in addition shows considerable detail in the region E of a densitometer curve such as that illustrated in Fig. 15.

Preferably, the channels formed by the teeth of the comb-like portion of the brass stack as well as the channels or grooves 31 of Fig. 4 are cut to a uniform width of 20 mils, and 20 mils deep, being 20 mils apart and about ¾ of an inch long. The specimen holders are mounted on a moving frame by means of the lugs 90 by means of a thumb screw passing through the opening 91. The perforations 95 of Figs. 1 to 5 and Fig. 14 are provided in order to fasten the specimen holders to a moving carriage such as that shown in the application bearing Serial No. 433,427, above mentioned.

The sample holder may take any one of a number of shapes and may be made up of any one of a number of materials such as resins, metals, glass, and the like, each being adapted to hold either on its surface or in grooves cut therein a predetermined quantity of the crystalline material or clusters of the crystalline material in the form of elongated samples of relatively coarse crystalline powder. With this apparatus the samples are ordinarily placed into and removed from the path of the flat incident beam of X-rays and as a result clear cut continuous line spectra of even intensity throughout are obtained.

Numerous other devices for moving the crystalline samples across the path of the incident X-ray beam of a Hull-Debye-Scherrer camera will, of course, readily suggest themselves to those skilled in the art upon reading the above disclosure. Thus a revolving disc having grooves cut radially in its surface or any similarly continuously or step-by-step moving sample mount may be used to cause a great number of crystal samples to pass through the path of the incident X-ray beam. Such apparatus and similar and equivalent apparatus is intended to be encompassed within the scope of the appended claims.

I claim:

1. The method of obtaining powder diffraction pictures with a powder holder and powder specimen without the superposition of any background contributed by the powder holder, which comprises packing the powdered specimen to a predetermined depth between the teeth of a comb-like structure, each tooth having one free end and one fixed end, the thickness of the tooth in a predetermined direction to the direction of alignment of the teeth of the comb being such as to be impervious to X-rays, moving the comb-like structure through the path of an incident X-ray beam so as to cause the X-rays to course down the channel formed by adjacent teeth of the comb-like structure and impinge upon the impacted specimen, and recording the diffraction of the incident beam by the powdered specimen.

2. The method of claim 1 wherein the X-rays are caused to course through the back of the comb and the powdered specimen is packed to a predetermined depth between the free ends of the teeth of the comb whereupon but a very light background is contributed by the portion of the powder holder through which the incident X-ray beam passes.

3. The method of claim 1 wherein the X-rays are caused to course between the teeth of the comb, and the powdered specimen is packed to a predetermined depth between the teeth and extending between the free and fixed ends of adjacent teeth, whereupon the background contributed by the powder holder is reduced to zero as shown on the recording.

4. Apparatus for holding comminuted samples in discrete portions for passage through an incident X-ray beam in a quadrant cassette for obtaining powder diffraction patterns of the sample, which comprises a comb-like structure having teeth between the teeth of which the sample is impacted to a predetermined depth, each tooth having a free end and a fixed end, the thickness of the teeth in a predetermined direction to the direction of alignment of the teeth of the comb being such as to be impervious to X-rays, and means for determining the depth to which the sample is impacted.

5. Apparatus according to claim 4 wherein the means for determining the depth to which the sample is impacted comprises a second comb-like structure similar to the first comb-like structure and having teeth insertable to a predetermined distance and with the free edges of the teeth of the second comb-like structure parallel with the direction of alignment of the teeth of the first comb-like structure and insertable between said latter teeth, whereupon the sample may be impacted to a predetermined depth between the teeth of the first comb-like structure in accordance with the extent of insertion of the second comb-like structure therein.

6. Apparatus according to claim 4, wherein the means for determining the amount of crystalline material impacted between the teeth of the comb-like structure comprises an additional slot cut at a predetermined distance from one side and parallel to the direction of alignment of the teeth so as to form a secondary small comb-like structure, a metal sheet insertable into the additional slot so formed whereupon the comminuted sample packed into the groove and between the teeth of the secondary comb-like structure to the above predetermined distance yields uniform specimens for the production of diffraction patterns upon the removal of the metal sheet, the channels between the teeth of both comb-like structures being simultaneously freed from any impediment to the incident X-rays except that formed by the sample.

7. Apparatus according to claim 4 wherein the direction in which the thickness of the teeth of the comb-like structure is impermeable to X-rays is a right angle.

DAN McLACHLAN, JR.